US007890489B2

United States Patent
Stewart et al.

(10) Patent No.: US 7,890,489 B2
(45) Date of Patent: *Feb. 15, 2011

(54) JUST-IN-TIME PUBLISHING SYSTEM AND PROGRAM PRODUCT FOR A PUBLISH/SUBSCRIBE MESSAGING SYSTEM USING A SUBSCRIBE-EVENT MODEL

(75) Inventors: Eben P. Stewart, Hamden, CT (US); Matthew Stoken, Apex, NC (US); Michael Van Der Meulen, Woodbridge, CT (US)

(73) Assignee: International Business Machines Corporation, Armonk, NY (US)

( * ) Notice: Subject to any disclaimer, the term of this patent is extended or adjusted under 35 U.S.C. 154(b) by 402 days.

This patent is subject to a terminal disclaimer.

(21) Appl. No.: 12/172,123

(22) Filed: Jul. 11, 2008

(65) Prior Publication Data

US 2009/0182742 A1   Jul. 16, 2009

Related U.S. Application Data

(63) Continuation of application No. 11/001,277, filed on Dec. 1, 2004, now Pat. No. 7,461,062.

(51) Int. Cl.
G06F 17/30    (2006.01)
G06F 7/00    (2006.01)

(52) U.S. Cl. ..................... 707/706; 707/736
(58) Field of Classification Search ........... 707/706, 707/999.003, 999.006
See application file for complete search history.

(56) References Cited

U.S. PATENT DOCUMENTS

| 5,963,951 | A | 10/1999 | Collins |
| 6,044,372 | A | 3/2000 | Rothfus et al. |
| 6,055,570 | A | 4/2000 | Nielsen |
| 6,081,840 | A | 6/2000 | Zhao |
| 6,122,633 | A * | 9/2000 | Leymann et al. ............ 1/1 |
| 6,571,140 | B1 | 5/2003 | Wewalaarachchi et al. |
| 6,741,980 | B1 * | 5/2004 | Langseth et al. ............ 1/1 |
| 7,120,628 | B1 * | 10/2006 | Conmy et al. ............ 1/1 |
| 2002/0138499 | A1 | 9/2002 | Anderson et al. |
| 2003/0061348 | A1 | 3/2003 | Jacobs, Jr. |
| 2003/0182234 | A1 | 9/2003 | Degroot |
| 2003/0208539 | A1 | 11/2003 | Gildenblat et al. |
| 2003/0217096 | A1 | 11/2003 | McKelvie et al. |
| 2004/0019645 | A1 | 1/2004 | Goodman et al. |
| 2004/0068481 | A1 | 4/2004 | Seshadri et al. |
| 2004/0153552 | A1 | 8/2004 | Trossen et al. |
| 2004/0215600 | A1 | 10/2004 | Aridor et al. |
| 2005/0086211 | A1 | 4/2005 | Mayer |
| 2005/0165656 | A1 | 7/2005 | Frederick et al. |
| 2005/0210062 | A1 | 9/2005 | Ordille et al. |
| 2006/0080394 | A1 | 4/2006 | Goodman et al. |
| 2006/0093142 | A1 | 5/2006 | Schneier et al. |
| 2006/0117005 | A1 | 6/2006 | Stewart et al. |

* cited by examiner

*Primary Examiner*—John R. Cottingham
*Assistant Examiner*—Noosha Arjomandi
(74) *Attorney, Agent, or Firm*—John E. Campbell

(57) ABSTRACT

A system, and program product having at least one subscriber subscribing to topics from one or more data sources. The data sources available and the number of subscriptions for each data source are registered in a table in real time. Upon detecting either subscription activity by the subscribers or availability of data on a data source, a matching routine compares the subscriptions registered for the available data source and enables the sending of messages from the available data source to subscriber/s.

16 Claims, 3 Drawing Sheets

JUST-IN-TIME PUBLISHING SYSTEM AND PROGRAM PRODUCT FOR A PUBLISH/SUBSCRIBE MESSAGING SYSTEM USING A SUBSCRIBE-EVENT MODEL

CROSS-REFERENCE TO RELATED APPLICATIONS

The present application is a continuation of U.S. patent application Ser. No. 11/001,277 by Eban P. Stewart et al. titled JUST-IN-TIME PUBLISHING VIA A PUBLISH/SUBSCRIBE MESSAGING SYSTEM USING A SUBSCRIBE-EVENT MODEL filed Dec. 1, 2004 now U.S. Pat. No. 7,461,062.

The present application is related to U.S. patent application Ser. No. 11/001,296 by Eban P. Stewart et al. titled JUST-IN-TIME PUBLISHING VIA A PUBLISH/SUBSCRIBE MESSAGING SYSTEM HAVING MESSAGE PUBLISHING CONTROLS, filed on the same date as the present application and assigned to the assignee of the present application.

BACKGROUND OF THE INVENTION

The present invention relates to a publish/subscribe messaging system, and more particularly relates to a publish/subscribe messaging system using a subscribe-event model.

Publish/subscribe messaging systems are used to publish subscription topics to subscribers. The subscription topics are usually defined ahead of time, and subscribers have access to this list at design-time (while developing the subscribing software) or run-time (dynamically provided by the publisher).

U.S. Pat. No. 6,571,140 issued May 27, 2003 to Wewalaarachchi et al. for SERVICE-ORIENTED COMMUNITY AGENT discloses a system and method to provide the creation and operation of remote real-time data monitoring and control systems and includes a communication gateway coupled to real-time devices. The communications gateway transforms the real time data collected for disparate and non-interoperable systems in a single common data format. The communications gateway provides an object server with a list of the real-time devices to which the communications gateway is connected, and their attributes. The object server publishes this list, and subscribers can access this list and request subscriptions to specific attributes of certain devices. The object server creates a data object corresponding to the requested information. A subscriber includes a service agent which accesses the object server.

U.S. Patent Application Publication US 2002/0138499 published Sep. 26, 2002 by Anderson et al. for FUNCTION/SERVICE BASED DATA EXPORT discloses a data exporter equipped to detect presence of an application of interest, identify exportable data of the application including the function/service affiliation of the exportable data, and export the data in a function/service based manner.

U.S. Patent Application Publication US 2003/0061348 published Mar. 27, 2003 by Jacors, JR for SYSTEM AND METHOD OF PROVIDING INFORMATION FROM A PLURALITY OF INFORMATION SOURCES discloses a system for providing specific information to a user and includes a subscription server which collects metric information from a plurality of metric publication providers. A user may log into the subscription server and subscribe to receive a specific set of metric data from a variety of metric publication providers. The user may define a user's view that presents only the metric data selected. A publication provider wishing to provide metric data via the subscription service sends a message to the subscription server indicating which metric information it publishes. The publication provider provides the metric information in a standardized form to the subscription server.

U.S. Patent Application Publication US 2003/0182234 published Sep. 25, 2003 by Degroot for METHOD AND SYSTEM FOR DOCUMENT PRESENTMENT BETWEEN GENERIC PUBLISHERS AND GENERIC SUBSCRIBERS discloses a method and system for electronic document presentment over the Internet. The system mediates between generic publishers and generic subscribers located remotely through software accessed over the Internet and allows publishers and subscribers to be categorized according to their relationship to each other.

U.S. Patent Application Publication US 2003/0208539 published Nov. 6, 2003 by Gildenblat et al. for EVENT DRIVEN INFORMATION PUBLICATION discloses an event-driven information publication system which includes one or more digital computer networks and one or more nodes on the computer networks. A node executed an information publication system application or applet. The note is capable of subscribing to one or more information item categories and receiving an information item that was published according to the one or more information item categories. The information publication system application processes the information item for display.

U.S. Patent Application Publication US 2003/0217096 A1 published Nov. 20, 2003 discloses a network-based messaging system having multiple agents to communicate messages between multiple users in real time. Persona agents collect information about the properties of other agents and publish the information to other subscribing agents.

BRIEF SUMMARY OF THE INVENTION

The present invention is a system and program product of providing publishable information through the use of a subscribe-event model. The subscribe-event model would allow the system to determine the actual information requested based on the current subscription table and updated whenever new processes subscribe to particular topic trees. The amount of load on the data sources available to the publish/subscribe system is reduced by consolidating the subscription requests into one service, rather than requiring the client to query each data source directly. This invention will also reduce the network utilization, since only one process is querying the data source and delivering the results to subscribers. This invention will also allow of the distribution of the data source providers, by allowing for the registration of such data collection agents into the publication/subscription system.

It is a common business process to select a group of news forums that a user would like to be alerted when a new message arrives. The most common way of doing this is by periodically polling the news server to determine if new messages have arrived. However, when the number of users grows beyond a certain size, this can place undue burden on the news server (many connections all querying for the same information). The present invention allows the users to subscribe to a general topic and define the specific forum to be used. The publication/subscription system would detect this subscription, and determine the type of subscription, and pass the information on to the appropriate data source provider to add that forum to the list of publishable topics. Another process (the data source provider) would then periodically check each forum requested, and publish a message alerting all subscribers that a new message had arrived on that forum. This reduces the load on the news server to a single connection and takes advantage of the large-scale publishing capabilities of the publication/subscription system. It also reduces the number of forums that the data source provider must monitor, since the provider has knowledge of which subscribe events have occurred, and the provider need only publish update alerts for forums to which at least one user has subscribed, ignoring all other forums, thus reducing computing resources.

It is thus an object of the present invention to use publish/subscribe (pub/sub) technology using subscription events as a source for publishable topics.

It is another object of the present invention to provide real-time dynamic collection of subscription information based on general classification of information requested by the subscriber.

It is a further object of the present invention to provide just-in-time on demand publication based on subscription lists such as by a publishing service that has no predetermined topic list.

It is a further object of the present invention to provide a dynamic number of data sources unknown to the system at runtime, and not necessarily know to the subscribers.

BRIEF DESCRIPTION OF THE SEVERAL
VIEWS OF THE DRAWING

These and other objects will be apparent to one skilled in the art from the following detailed description of the invention taken in conjunction with the accompanying drawings in which.

DETAILED DESCRIPTION OF THE INVENTION

Figure 1:
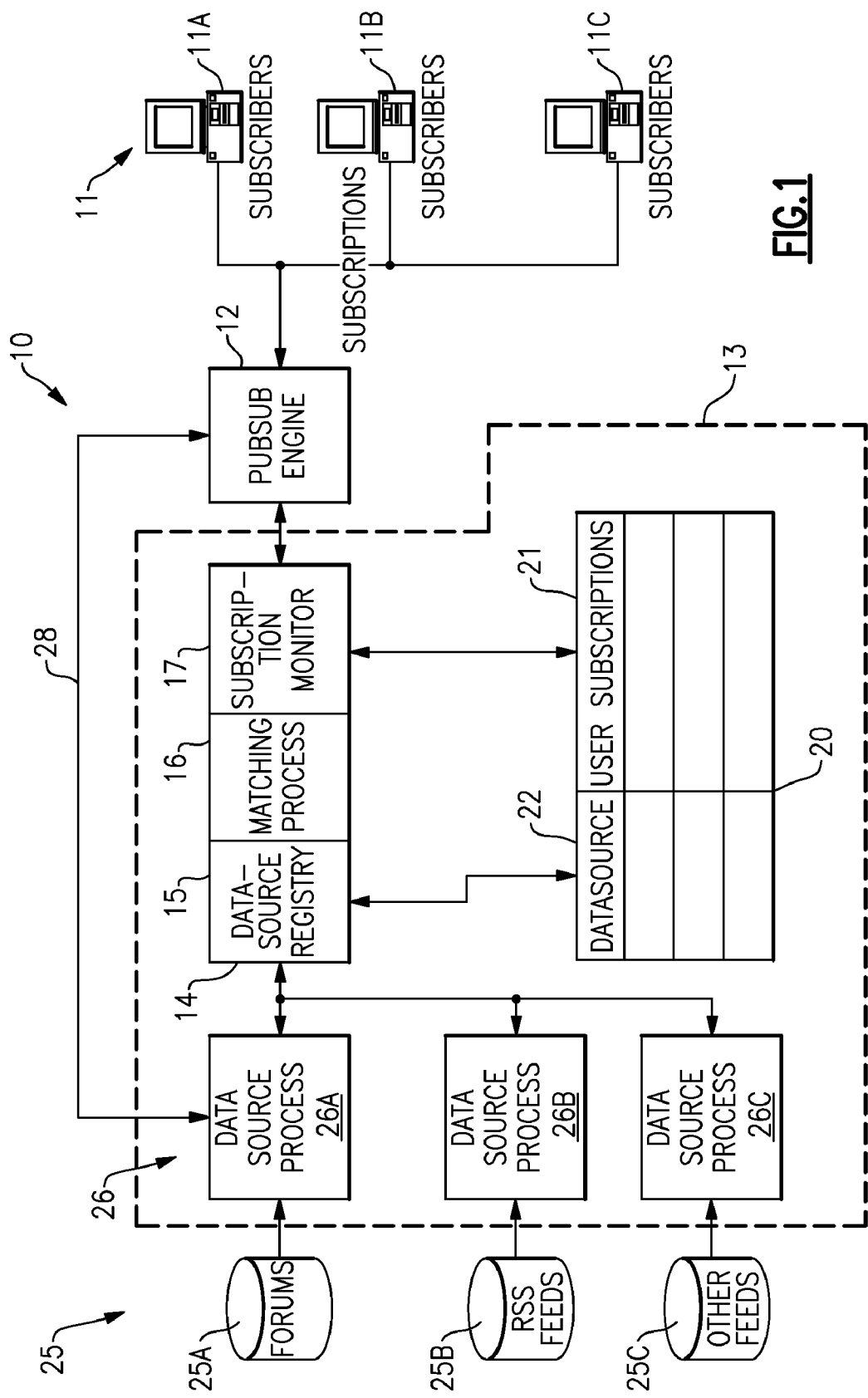
FIG. 1 is a schematic diagram of a system of the present invention and having subscribers for subscribing to topics available from data sources.

FIG. 1 is a schematic diagram system 10 of the present invention. In FIG. 1, one or more subscribers 11 connect to and make subscriptions to a publish/subscribe engine 12 for topics of interest to the subscriber 11 making the subscription. The publish/subscribe engine 12 may be, for instance, the WebSphere Business Integration Message Broker available from IBM Corp. of Armonk, N.Y. Such a publish/subscribe engine is described in U.S. patent application Ser. No. 10/207,711 for INTERACTIVE FILTERING ELECTRONIC MESSAGES RECEIVED FROM A PUBLICATION/SUBSCRIPTION SERVICE, U.S. Patent Application Publication US 2004/0019645 A1) and U.S. patent application Ser. No. 10/207,685 for INTERACTIVE ONE TO MANY COMMUNICATION IN A COOPERATING COMMUNITY OF USERS, U.S. patent Application Publication US2004/0019637 A1), both owned by the assignee of the present invention and incorporated herein by reference. The publish/subscribe engine is responsible for maintaining the connections to the subscribers 11 and delivering published messages to the appropriate subscribers 11.

The system of FIG. 1 includes a just-in-time publish/subscribe (sub/pub) messaging system 13 which includes a subscription process 14 which includes a data source registry 15, a matching process or routine 16 and a subscription monitor 17. A subscription table 20 includes a user subscription portion 21 and a data source portion 22. The subscription monitor 17 detects the subscriptions and maintains the user subscription portion 21, and the data source registry maintains the data source portion 22. The subscription portion 21 and data source portion 22 are shown as part of one table for convenience only. It will be understood that the user subscription portion 21 and the data source portion 22 may be in separate tables or combined into one table as shown in FIG. 1. It will further be understood that the user subscriptions portion 21 and data source portion 22 of the subscription table 20 need not be contiguous in a computer memory, and further may be stored in the same or different portions of a computer memory device, or in separate computer memory devices, as desired.

The user subscriptions portion 21 stores statistics of the subscriptions topics and the categorization and specifics of the data being requested. For example, the entire system may have a prefix of "subpub", a subtopic of the data type, the third topic of a specific news forum server, and a forth topic of the specific form to be listened to, such as "/subpub/forum/forums.ibm.com/forums.architecture.pubsub".

The data source portion 22 is maintained by the data source registry 15 wherein each data source, to be discussed, is registered. The matching process 16 of the subscription process 14 matches the availability of a data source registered in the data source portion 22 with user subscriptions in the user subscription portion 21 of the subscription table 20. The matching process 16 looks for matches when a new subscription is received, or when a data source is established, or when a data source reports that it has new data for transmission.

One or more data sources 25 are connected to the subscription process 13, and may include forums 25A, RSS feeds 25B, or other feeds 25C. Each data sources 25 are connected to a data source process 26 (e.g. data source 25A to data source process 26A, data source 25B to data source process 26B, and data source 25C to data source process 26C). The data source processes 26 control the data delivered from their respective data sources 25 to the subscriber or subscribers 11 subscribing to the information from that data source. This is done by turning on or off the data source process 26, as will be discussed.

When new data is available from a data source 25, its corresponding data source process 26 reports to the data source registry 15 that its data source exists or is available. The data source is then recorded by the data source registry 15 in the data source portion 22 that the data source is available to the subscribers 11.

It will be understood that the data source registry 15 and subscription monitor 17 provide for real-time collection of available data sources and subscriptions. Real-time means that as soon as data source availability and user subscriptions are posted to the subscription table 20, the recorded information is available by the matching process 16 to provide data source data to subscribers. The subscription process 14 thus provides real-time collection via the information from publish/subscribe engine 12. It will be understood that there is real-time collection of subscription information, and not subscriptions from a predetermined list. The matching process 16 matches available information against the currently registered data sources 25 and insures that a data source process 26 is active for the particular data source 25. The data source registry 15 will dynamically turn the data source processes 26 on and off based on the listening activity reported by the subscription monitor 17. Thus, there is provided a system wherein there is a dynamic number of data sources unknown to the system at runtime, and not necessarily known to the subscribers. In one preferred implementation, the data source processes 26 may be distributed to various external systems, or consolidated into a virtual service directory to provide flexibility.

When a data source process 26 detects that a change has occurred in its connected data source 25 (a new forum post has occurred), a message is generated and published through the publish/subscribe engine 12 to be delivered to the subscribers over connection 28. The change in a data source 25 is also registered in the subscription table 20. Further, the data source process 26 may be turned off if the number of subscriptions registered in the user subscription portion 21 is not equal to or larger to a designated number, such that changes in the data source 25 will not result in a message if there are no subscriptions or a low number of subscriptions for the data source data. The number of the subscriptions needed to generate a message to a subscriber may be dynamically changed according to the time of day, the load on the system, the topic subscriptions, or other factors, as desired.

Figure 2:
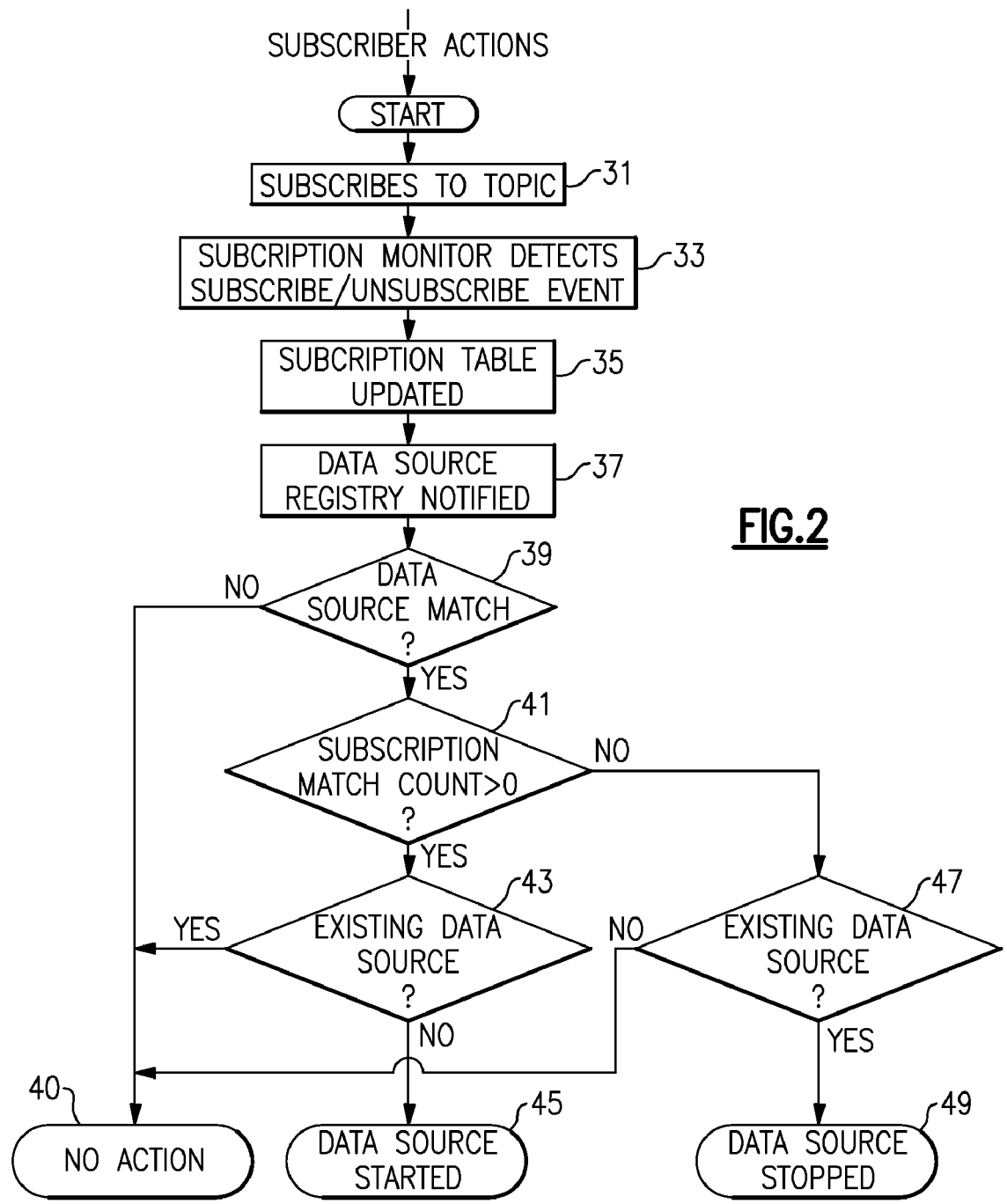
FIG. 2 is a flow diagram showing the flow of a subscriber action of subscribers of the system of FIG. 1.

FIG. 2 is a flow diagram showing the flow of a subscriber action. At 31, a subscriber 11 either subscribes to or unsubscribes from a topic such as through a client of IBM Community Tools available from IBM Corp. At 33, the subscription monitor 17 detects the subscribe/unsubscribe event by the subscriber 11. At 35, the subscription monitor 17 takes a snapshot of the subscriptions in the subscription table 20 and updates the table based on the detected subscribe/unsubscribe event detected. The snapshot includes the topic subscribed to and the number of subscriptions registered. At 37, the data source registry 15 is notified of the subscribe/unsubscribe event.

At 39, the matching process 16 finds a match to the data source 25 as previously recorded in the subscription table 20, and the topic being subscribed to or unsubscribed from by the reported subscriber event. If there is no match found at 39, no action is taken at 40. If there is a data source match at 39, at 41 the subscription match count registered in the subscription table 20 is compared to a desired number (for example zero) to see if further action is required. If the count is greater than the desired number at 41, the data source registry determines if an existing data source is available (i.e. its associated data source process is on and active) at 43. If there is an existing data source found at 43, no action is taken at 40. If there is no existing data source at 43, at 45 the data source registry 15 notifies the proper data source process 26, and the data source is started.

If the subscription match count is not above the specified threshold value (for instance zero) at 41, a check is made at 47 to determine if the data source exists. If the check at 47 is no, the no action is taken at 40. If there is a data source at 47, the data source is stopped at 49 such that messages from the data source 25 are not delivered by its associated data process 26 to the subscribers 11. It will thus be understood that if a data source is not subscribed to by some minimum number or subscribers, the data source is turned off so that its messages are not handled, thus saving system resources.

Figure 3:
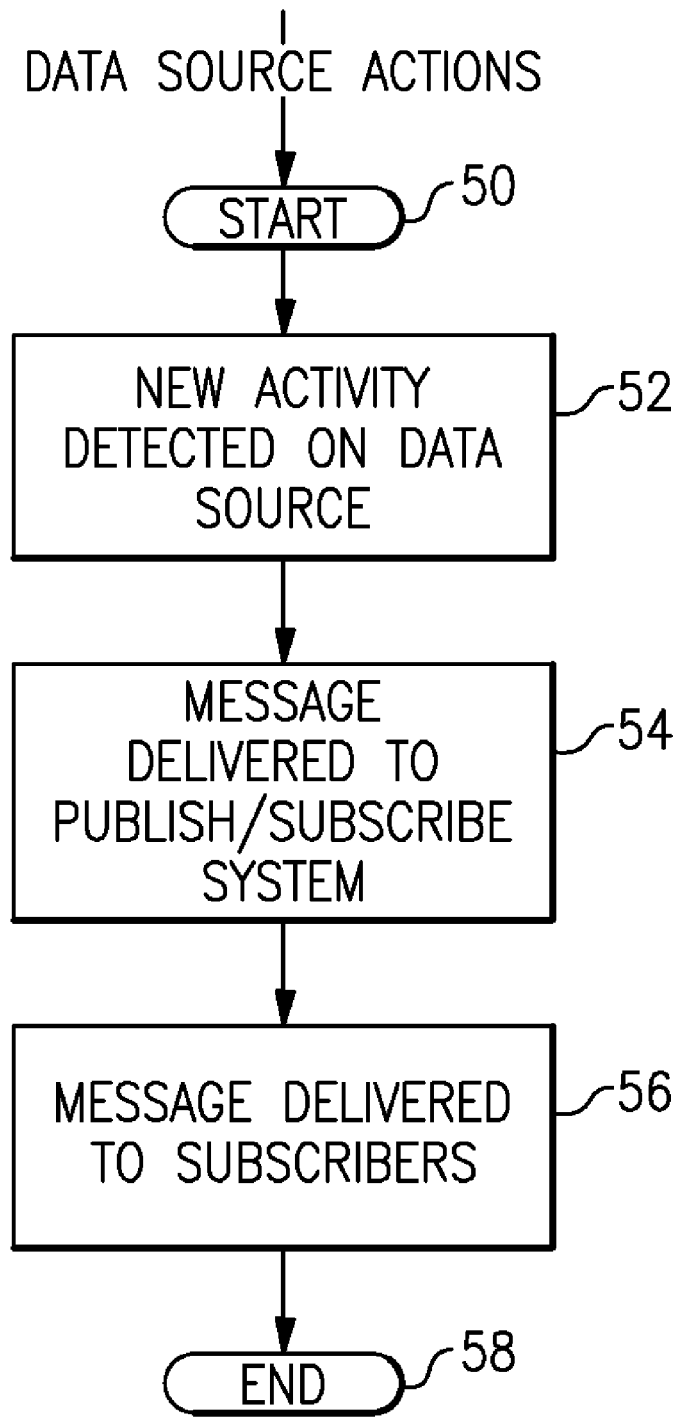
FIG. 3 is a data flow diagram for data source actions of data sources of the system of FIG. 1.

FIG. 3 is a data flow diagram for data source actions. The data source action from a data source 25 of the FIG. 1 starts at 50. The data source process 26 associated with the data source 25 having activity detects the new activity at 52. At 54, the data source process 26 delivers a message to the publish/subscribe engine 12 to be delivered to a subscriber of that data source 25 having activity, when the subscribed to data topic is active and has data available. It will be understood that the message will be delivered from the data source process 26 only if it has not been stopped or turned off at 49 because its subscription match count is not above a designated threshold level at 41, as discussed in connection with FIG. 2. At 56, the message from the data source process 26, if it has been turned on at 45, is delivered by the publish/subscribe engine 12 is delivered to the subscriber or subscribers 11 who have subscribed to the data from the data source 25 having activity. The data source action ends at 58. It will be understood that in the present system, messages will not be transmitted through the system if the data to be published is not subscribed to, or not subscribed to above some preset threshold level. As mentioned, the threshold level may be dynamically set or reset depending on the time of day, the load on the system, the popularity of the topic, or any other measurement, as desired. This could include messages per second/minute/hour based on the load both from the number of updates coming from the source, and the number of people listening.

It will be understood that the forums 25A and RSS feeds 25B are examples only, and that the other feeds 25C may include many kinds of data sources. For instance, the data source might be a large newspaper with many sections and news topics. A subscriber might only be interested in sections of the paper, and perhaps only articles dealing with a particular topic. The subscriber would only subscribe to sections or topics of interest, and the newspaper publisher would then publish a number of issues or subsets of daily and Sunday editions based on the aggregate subscription counts for each section or topic. The subscribers would then receive a newspaper with fewer of the sections which are not of interest. Such a system could further be used for electronic magazines or other publishing applications for providing a completely customized subscription, thus allowing the information source to determine the number of subsets of the information to be published for subscribers who are interested in only the subset, rather than publishing all of the publication to all subscribers.

It will be understood that the other feeds 25C may be, for instance, forums, RSS/Atom, Wikis, WebLogs, webpages, public databases and servers logs or other monitorable information, and may include any generic source of information.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or provided separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. In a publish/subscribe system having one or more subscribers subscribing to data from one or more data sources, a just-in-time messaging system comprising:
  a memory;

a subscription table in which is recorded in real time, subscription requests from subscribers, said subscription requests including specific data sources to be subscribed to, said subscription table storing statistics of the subscriptions topics and the categorization and specifics of the data being requested including a system prefix, subtopic of the data type, specific news forum served, and specific forum to be listened to, a subscriber subscribing to a topic by said publish/subscribe system;

a data source table in which is recorded in real time, data sources for providing data to subscribers;

a matching routine connected to said subscription table and said data source table for comparing data source subscription requests in the subscription table with data sources of the data source table as said data sources become available and without further input from said subscribers, said matching routine matching subscription requests by said statistics for the subscriptions topics and categorization and specifics with currently available and active data sources;

a real-time enabling routine responsive to said matching routine for enabling or disabling message transmissions from a subscribed to data source recorded in said data source table to a subscriber having a subscription for said subscribed to data source in said subscription table through a publish/subscribe engine; and a search routine searching with said matching routine for matches, immediately after the updating of either of said user subscription table of said data source table.

2. The publish/subscribe system according to claim 1 further comprising a subscription monitor for recording subscriptions from said subscribers into said subscription table.

3. The publish/subscribe system according to claim 1 further comprising a data source registry for recording available data sources into said data source table.

4. The publish/subscribe system according to claim 3 further comprising a data source provider associated with each data source and connected to said data source registry, each data source provider for reporting to said data source registry when its associated data source has data available.

5. The publish/subscribe system according to claim 4 wherein each of said data source providers controls messages from its associated data source to subscribers and is responsive to said matching routine for sending messages when said matching routine finds a match.

6. The publish/subscribe system according to claim 1 wherein said subscription monitor updates said subscription table immediately upon a subscription being received from a subscriber.

7. The publish/subscribe system according to claim 6 wherein said data source registry updates said data source table immediately upon a data source becoming available or unavailable for sending messages.

8. The publish/subscribe system according to claim 1 wherein said data sources includes one of a forum, a web feed, a webpage, a public database or a server log.

9. A computer program product for use in a publish/subscribe system having one or more subscribers subscribing to data from one or more data sources, a computer program product stored in a non-transitory computer readable media that recorded therein computer readable program code for executing a method for just-in-time messaging comprising the steps of:

recording in real time in a subscription table, subscription requests from subscribers, said subscription requests including specific data sources to be subscribed to, said subscription table storing statistics of the subscriptions topics and the categorization and specifics of the data being requested including a system prefix, subtopic of the data type, specific news forum served, and specific forum to be listened to, a subscriber subscribing to a topic;

recording in real time in a data source table, data sources for providing data to subscribers;

comparing with a matching routine connected to said subscription table and said data source table, data source subscription requests in the subscription table with data sources of the data source table as said data sources become available and without further input from said subscribers, said matching routine matching subscription requests by said statistics for the subscriptions topics and categorization and specifics with currently available and active data sources;

in real time and responsive to said matching routine comparing step, one of enabling or disabling message transmissions from a subscribed to data source recorded in said data source table to a subscriber having a subscription for said subscribed to data source in said subscription table through a publish/subscribe engine; and searching with said matching routine for matches, immediately after the updating of either of said user subscription table or said data source table.

10. The computer program product according to claim 9 wherein said method further comprises recording with a subscription monitor, subscriptions from said subscribers into said subscription table.

11. The computer program product according to claim 9 wherein said method further comprises recording with a data source registry, available data sources into said data source table.

12. The computer program product according to claim 11 wherein said method further comprises recording:

associating a data source provider with each data source; and notifying said data source registry by said data source provider, when the respective data source associated with a data source provider has data available.

13. The computer program product according to claim 12 wherein said method further comprises controlling with each of said data source providers, messages from the respective associated data source to subscribers responsive to said matching routine thereby sending messages from a subscribed to data source to a subscriber when said matching routine finds a match.

14. The computer program product according to claim 9 wherein said method further comprises updating said subscription table with a subscription monitor immediately upon a subscription being received from a subscriber.

15. The computer program product according to claim 14 wherein said data source registry updates said data source table immediately upon a data source becoming available or unavailable for sending messages.

16. The computer program product according to claim 9 wherein said data sources includes one of a forum, a web feed, a webpage, a public database or a server log.

* * * * *